(12) United States Patent
Chen et al.

(10) Patent No.: US 8,068,657 B2
(45) Date of Patent: Nov. 29, 2011

(54) METHOD OF MICROCALCIFICATION DETECTION IN MAMMOGRAPHY

(75) Inventors: Shoupu Chen, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 644 days.

(21) Appl. No.: 12/211,405

(22) Filed: Sep. 16, 2008

(65) Prior Publication Data
US 2010/0021036 A1    Jan. 28, 2010

Related U.S. Application Data

(60) Provisional application No. 61/083,638, filed on Jul. 25, 2008.

(51) Int. Cl.
*G06K 9/62* (2006.01)
*A61B 6/04* (2006.01)

(52) U.S. Cl. .......................................... 382/132; 378/37

(58) Field of Classification Search ................. 382/128, 382/130–132; 378/37, 62, 64
See application file for complete search history.

(56) References Cited

U.S. PATENT DOCUMENTS

| | | | |
|---|---|---|---|
| 6,434,262 B2 * | 8/2002 | Wang | 382/132 |
| 6,628,815 B2 * | 9/2003 | Wang | 382/132 |
| 6,763,128 B1 * | 7/2004 | Rogers et al. | 382/130 |
| 7,315,640 B1 * | 1/2008 | Brady et al. | 382/132 |
| 7,783,089 B2 * | 8/2010 | Kaufhold et al. | 382/128 |

OTHER PUBLICATIONS

A. Karahaliou et al., "Texture analysis of tissue surrounding microcalcifications on mammograms for breast cancer diagnosis," The British J. Radiology, 80 (2007), pp. 648-656.
A. Papadopoulos et al., "An automatic microcalcification detection system based on a hybrid neural network classifier," Artificial Intelligence in Medicine, 25 (2002), pp. 149-167.
P. Viola et al., "Robust real-time object detection," 2nd Int. Workshop on Statistical and Computational Theory of Vision, (2001), pp. 1-25.
K. Thangavel et al., "Automatic Detection of Microcalcification in Mammograms—A Review," Int. J. on Graphics, Vision and Image Processing, vol. 5, Issue 5 (2005), pp. 31-61.
L. Bocchi et al., "Detection of single and clustered microcalcifications in mammograms using fractals models and neural networks," Med. Engineering & Physics, 26 (2004), pp. 303-312.
J. Ge et al., "Computer-aided detection system for clustered microcalcifications: comparison of performance on full-field digital mammograms and digitized screen-film mammograms," Phys. Med. Biol., 52 (2007), pp. 981-1000.

(Continued)

*Primary Examiner* — Irakli Kiknadze

(57) ABSTRACT

A method of microcalcification detection in a digital mammographic image identifies one or more potential microcalcification sites in the mammographic image according to spot clustering. Each of the one or more potential microcalcification sites is assigned either as a member of a positive candidate set or as a member of a rejected candidate set. Optionally at least one subsequent classifier process that selectively assigns zero or more members of the positive candidate set to the rejected candidate set is executed, according to results from the at least one subsequent classifier process. One or more members of the rejected candidate set are selected as a reclamation candidate set according to results from the initial and any subsequent classifier process. One or more members of the reclamation candidate set are assigned either back to the rejected candidate set or to the positive candidate set according to results from a reclamation classifier process.

14 Claims, 9 Drawing Sheets

OTHER PUBLICATIONS

H. Kang et al., "A Microcalcification Detection Using Adaptive Contrast Enhancement on Wavelet Transform and Neural Network," IEICE Trans. Inf. & Syst. vol. E89-D, No. 3 (2006), pp. 1280-1287.

S. Halkiotis et al., "Automatic detection of clustered microcalcifications in digital mammograms using mathematical morphology and neural networks," Signal Processing, 87 (2007), pp. 1559-1568.

D. Sankar et al., "Fractal Modeling of Mammograms based on Mean and Variance for the Detection of Microcalcifications," Proc. Int. Conf. Computational Intelligence and Multimedia Applications, (2007), pp. 334-338.

K. Hirako et al., "Development of Detection Filter for Microcalcifications on Mammograms: A Method Based on Density Gradient and Triple-Ring Filter Analysis," Systems and Computers in Japan, vol. 27, No. 13 (1996), pp. 36-48.

* cited by examiner

702

1. $\forall i, j \quad if(I_{i,j} > thd\_I) \quad g_{i,j} = \nabla|I_{i,j}|$
2. $\forall k; \quad do$
3. $\forall i, j; \quad if((g_{i,j} > thd\_g) \& (\mathbf{S}^k(I_{i,j}) > thd\_I2))$
4. $\quad\quad\quad if(\overline{\mathbf{S}}^k(g_{i,j}) > thd\_g2)$
5. $\quad\quad\quad \mathbf{S}^k(g_{i,j}), k, i, j \rightarrow spotList$
6. $merge(spotList)$

FIG. 6

METHOD OF MICROCALCIFICATION DETECTION IN MAMMOGRAPHY

CROSS REFERENCE TO RELATED APPLICATIONS

Reference is made to, and priority is claimed from, U.S. Provisional Patent Application No. 61/083,638 filed on 25 Jul. 2008 entitled METHOD OF MICROCALCIFICATION DETECTION IN MAMMOGRAPHY APPLICATIONS by Chen et al.

FIELD OF THE INVENTION

The invention relates generally to image processing in mammography, and in particular, to microcalcification detection.

BACKGROUND OF THE INVENTION

A sizable percentage of abnormalities in mammograms consists of microcalcifications (MCCs) that are tiny deposits (spots) of calcium in breast carcinoma and that account for up to 50% of the diagnosed cases. It is also recognized that MCC clusters are early signs of breast cancer. Various computer aided diagnosis (CAD) systems have been developed to help radiologists in making decisions concerning follow up and biopsies, applying pattern classifiers to identifiable features either of MCC spots or of background (for example, A. Karahaliou, S. Skiadopoulos, I. Boniatis, P. Sakellaropoulos, E. Likaki, G. Panayiotakis and L. Costaridou, "Texture analysis of tissue surrounding MCCs on mammograms for breast cancer diagnosis," *The British J Radiology*, 80, 648-656 (2007)).

"Single-stage" classifiers such as rule-based systems, fuzzy logic systems, support vector machines and, overwhelmingly, neural networks (NN), are reported in the literature for the use of MCC classification (A. Papadopoulos, D. Fotiadis and A. Likas, "An automatic microcalcification detection system based on a hybrid neural network classifier," *Artificial Intelligence in Medicine*, 25, 149-167 (2002)). Papadopoulos et al., in their MCC detection algorithm, use a rule-based sub-system that removes false positives while retaining majority true positives, followed by an NN subsystem that determines the final classification performance. The category of 'hybrid' classifier can also be found in other research areas such as face detection with cascading classifiers (see P. Voila and M. Jones, "Robust real-time object detection," $2^{nd}$ *Int. Workshop on Statistical and Computational Theory of Vision*, 1-25 (2001)). In Voila and Jones' implementation, the cascade classifier consists of a number of independent, discriminating modules called "strong classifiers" that are trained to discriminate between object and non-object windows by examining specific image measurements from an object candidate window supplied by a list of objects. In the context of the present invention, so-called 'hybrid' classifiers or cascade classifiers are considered single-stage classifiers as opposed to the multistage classifier that is to be addressed subsequently.

To the diagnostician, it is desired that MCCs be found early so that cancer mortality can be reduced. With this requirement in mind, researchers have developed automated MCC site detection algorithms and utilities that are increasingly capable, achieving accurate classification of a high percentage of true positives (TPs), with accuracy levels above 0.90 and even as high as 0.95 in some cases. Similarly, it is desirable to minimize the number of false positives (FPs) to no more than about 0.2 FPs per image processed. While the results that have been achieved by such CAD systems are impressive, however, some diagnosticians are requesting more; some diagnosticians prefer that CAD tools for MCC detection show virtually all MCC sites in order to be acceptable.

It is understood that MCC segmentation is one aspect of MCC classification. A popular approach toward MCC spot candidate segmentation is applying contrast enhancement to the digitized mammograms followed by image segmentation and classification procedures (K. Thangavel, M. Karnan, R. Sivajumar and A. Mohideen, "Automatic detection of microcalcification in mammograms—a review," *Int. J. on Graphics, Vision and Image Processing*, 5 (5) 31-36 (2005)). Bocchi et al. use a fractal model to describe the mammography image, allowing the use of a matched filtering stage to enhance MCC against the background. Image segmentation is carried out by growing connected components of the filtered image after zero thresholding (L. Bocchi, G. Coppini, J. Nori and G. Valli, "Detection of single and clustered microcalcifications in mammograms using fractals models and neural networks," *Med. Imaging & Phys.*, 24, 303-312 (2004)). Ge et al. employ a difference-image technique using an 8×8 box-rim filter to enhance signal to noise ratio of the MCCs. A global thresholding procedure is then used to segment the individual MCC candidates from the difference image (J. Ge, L. Handjiiski, B. Sahiner, J. Wei, M. Helvic, C. Zhou and H. Chan, "Computer-aided detection system for clustered microcalcifications: comparison of performance on full-field digital mammograms and digitized screen-film mammograms," *Phys. Med. Biol.*, 52, 981-1000 (2007)). Kang, Ro and Kim in their paper (H. Kang, Y. Ro and S. Kim, "A microcalcification detection using adaptive contrast enhancement on wavelet transformation and neural network," *IEICE T. Inf & Syst*. E89-Db B (3), 1280-1287 (2006)) introduce an image enhancement method by utilizing noise characteristics to change the parameters in homomorphic filtering that decreases the energy of low frequencies while increasing that of high frequencies in the image. The homomorphic filter is applied to wavelet coefficients after performing wavelet transformation of the mammographic image.

There are publications that describe methods of MCC spot candidate segmentation without explicit image enhancement procedures. Halkiotis et al. (S. Halkiotis, T. Botsis and M. Rangoussi, "Automatic detection of clustered microcalcifications in digital mammograms using mathematical morphology and neural networks," *Signal Processing*, 87, 1559-1568 (2007)) consider each mammogram as a topographic representation, each MCC as an elevation constituting a regional maximum. A morphological operation (geodesic dilation and geodesic erosion) is applied to remove noise and regional maxima that do not correspond to calcifications. Sankar and Thomas use deterministic fractal objects to model the breast background tissues based on the mean and variance of the image blocks. Microcalcification spot candidates can be segmented by taking the difference between the original image and the modeled image (D. Sankar and T. Thomas, "Fractal modeling of mammograms based on mean and variance for the detection of MCCs," *Proc. Int. Conf. Computational Intelligence and Multimedia Applications*, 334-338 (2007)). Hirako et al. consider the MCC spot as having a circular cone. They use a triple-ring filter to extract features using the image gradient information to segment MCC spots (K. Hirako, H. Fujita and T. Hara, "Development of detection filter for microcalcifications on mammograms: a method based on density gradient and triple-ring filter analysis," *Systems and Computers in Japan*, 27 (13), 36-48 (1996)). Hirako's method explores the underlying directional information of the MCC spots. This approach, however, is disadvantaged, often introducing noise to the processed image.

There is a need for improved performance and accuracy in CAD utilities that provide MCC detection. However, even with improved segmentation techniques, more capable image processing software, more powerful computing hardware, and continuing work on image classifiers, the goal of achieving near-100% accuracy remains elusive.

SUMMARY OF THE INVENTION

It is an object of the present invention to advance the art of microcalcification detection in mammography. With this object in mind, the present invention provides a method of microcalcification detection in a digital mammographic image, comprising: identifying one or more potential microcalcification sites in the mammographic image according to spot clustering criteria; assigning each of the one or more potential microcalcification sites either as a member of a positive candidate set or as a member of a rejected candidate set according to results from an initial classifier process; optionally executing at least one subsequent classifier process that selectively assigns zero or more members of the positive candidate set to the rejected candidate set according to results from the at least one subsequent classifier process; selecting one or more members of the rejected candidate set as a reclamation candidate set according to results from the initial and any subsequent classifier process; and assigning one or more members of the reclamation candidate set either back to the rejected candidate set or to the positive candidate set according to results from a reclamation classifier process.

It is a feature of the present invention that it uses a succession of classifiers that analyze subsets of the potential microcalcification sites, selecting each successive analyzed subset based on prior classification results.

It is an advantage of the present invention that it re-examines a portion of rejected microcalcification sites to provide increased true-positive detection over conventional cascaded classifier approaches.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings.

FIG. 6 is a table illustrating exemplary steps of the multi-scale ring-like filtering in an embodiment of the present invention.

DETAILED DESCRIPTION OF THE INVENTION

Figure 1A:
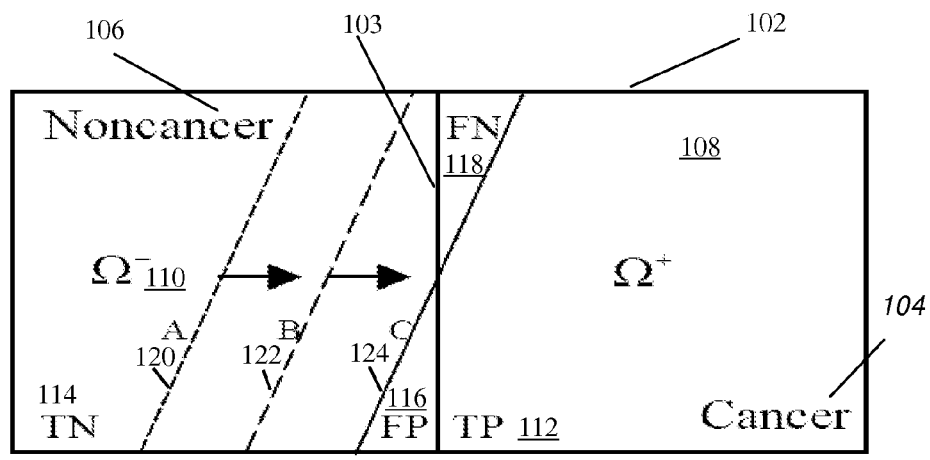
FIG. 1A is an illustration of an embodiment of a stage-1 microcalcification detection for the current invention.

In the following detailed description of embodiments of the present invention, reference is made to the drawings in which the same reference numerals are assigned to identical elements in successive figures. It should be noted that these figures are provided to illustrate overall functions and relationships according to embodiments of the present invention and are not provided with intent to represent actual size or scale.

The subject matter of the present invention relates to digital image processing and computer vision technologies, which is understood to mean technologies that digitally process data from a digital image to recognize and thereby assign useful meaning to human-understandable objects, attributes or conditions, and then to utilize the results obtained in the further processing of the digital image.

Multi-Stage Processing

As noted in the background section given earlier, the conventional approach to improved detection of True Positives (TPs) has been focused on attempting to make incremental enhancements and improvements to existing MCC classifiers and related algorithms. Instead of attempting to extract even higher performance from existing classifiers, embodiments of the present invention apply a two-stage process to the classification problem. In a first stage, a cascaded classification sequence is performed. Then, in a second stage, processing is directed to reclassify a small subset of possible MCC sites that have already been rejected by the MCC classifiers in the first stage. This translates to improved detection of True Positives (TPs) while accepting a relatively higher rate of false positives (FPs), within a tolerable range, and achieves an extremely low rate of false negatives (FNs) as a result.

With this goal of achieving higher detection accuracy in mind, a multistage classification system according to an embodiment of the present invention operates as follows:

(i) first (stage-1), minimize the classification error in terms of FPs (e.g. 0.2 false positives per image) while maintaining a sufficient high rate of true positives (TPs) (e.g. 0.95); and (ii) second (stage-2), maximize the overall TPs by re-classifying a portion of the negatives (FN plus true negative (TN)) from the stage-1 operation in order to increase the overall TP throughput, possibly with additional FPs added to the classification results.

The system of the present invention (stage-1 plus stage-2) can be constructed so that an end-user is free to switch off the stage-2 classifier in order to maintain a lower false positive rate if so desired. Additionally, when displayed, the MCC cluster candidates detected in stage-2 may be identified with a marker or other highlight marking having different color or shape than is used for stage-1 candidates in order to prompt the user to examine the results more carefully, since the MCCs detected in stage-2 processing are less certain than those identified in stage-1 processing. For example, MCCs detected in stage-1 processing appear with yellow markers and MCCs detected in stage-2 processing appear with green markers on a display screen. Alternately, different shapes or sizes of marker are used for MCC sites detected in stage-1 and stage-2 processing, as described by way of example subsequently. An improved MCC spot candidate segmentation strategy is used in embodiments of the present invention to provide a foundation for MCC classification, as described in more detail subsequently.

It is instructive to describe how MCC spots and clusters are initially identified for stage-1 processing using suitable image processing algorithms (enhancement, segmentation and classification) and then processed using embodiments of the present invention for microcalcification detection. To form a spot, bright image pixels that indicate a dense anatomical structure are identified, and then grouped using a set of criteria related to connectedness between pixels. That is, a pixel in a spot must both have brightness exceeding some threshold brightness value and be connected to at least one of the other pixels in the spot. These MCC image spots are then further grouped into a plurality of MCC clusters each of which contains a predetermined number of spots, such as three or more MCC spots, for example. That is, a spot in an MCC cluster is within a predetermined distance of at least one of the other spots in the MCC cluster. An exemplary predetermined distance is 10 pixels. With potential or candidate MCC sites thus identified, pattern classification modules (classifiers) are iteratively applied in a sequence that separates each member of the complete set of candidate MCC clusters, that is, each potential microcalcification site, into one of two mutually exclusive cluster sets. These two mutually exclusive cluster sets are:
   (i) a cancer MCC cluster candidate set, also termed a positive candidate set; and
   (ii) a noncancer MCC cluster candidate set, also termed a rejected candidate set.

These mutually exclusive sets are formed using decision criteria that are learned from sample cancer MCC clusters and non-cancer MCC clusters.

Figure 1B:
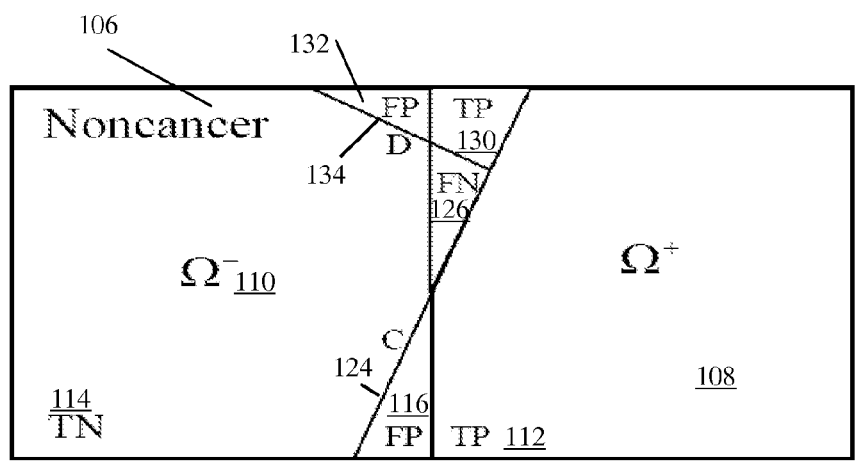
FIG. 1B is an illustration of an embodiment of a stage-2 microcalcification detection for the current invention.
Figure 1C:
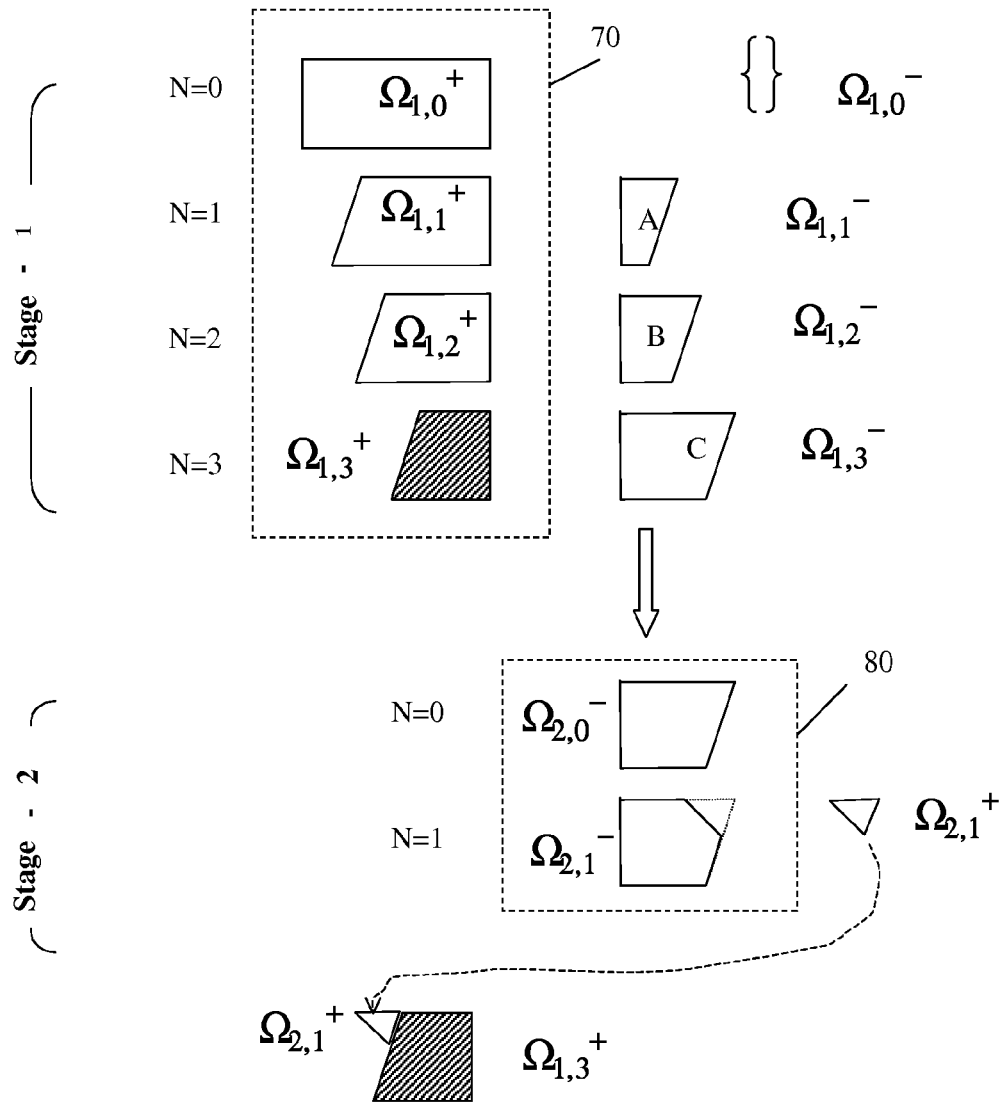
FIG. 1C is a block diagram showing the sequence of processing for stage-1 and stage-2 detection according to one embodiment of the present invention.

In the present invention, the 'hybrid' classifiers or cascaded classifiers of stage-1 processing are considered as single-stage classifier systems. FIG. 1A graphically describes the operation of the cascade classifiers of a stage-1 classifier system. FIG. 1B then shows what subsequent stage-2 classification adds to the initial cascaded classifier processing. FIG. 1C shows the logic flow from one processing operation to the next in both stage-1 and stage-2 operations (70, 80).

Turning first to FIG. 1A, the rectangular population box 102 represents the entire population of potential microcalcification sites (both cancer MCC clusters 104 and noncancer MCC clusters 106) with a vertical line as a divider 103. These MCC clusters are, however, unknown to the stage-1 system. The task of the stage-1 system is to classify these MCC clusters, by assigning each of the potential microcalcification sites into one of two mutually exclusive sets, labeled with the following notation:
   (i) $\Omega^+$ cancer MCC cluster candidate set, termed the working set or positive candidate set for embodiments of the algorithm of the present invention; and
   (ii) $\Omega^-$ noncancer MCC cluster candidate set, termed the rejected candidate set.

In operation, the task of a classifier is to remove noncancer MCC cluster candidates from the working positive candidate set $\Omega^+$ and assign them as members of the rejected candidate set $\Omega^-$.

In the particular example of FIG. 1A, a cascading classifier system (stage-1 classifier system) contains three individual classifiers shown as A, B, and C, and executing in that order. Therefore, the first classifier A operates on the entire MCC cluster population, denoted as set $\Omega^+$. Thus, at the beginning of classifier processing, every potential MCC site that is identified is considered as a cancer MCC cluster candidate; at the same time, $\Omega^-$ begins as a null set.

The operation of classifier A in an initial classifier process results in the removal or rejection of a fraction of the noncancer MCC cluster population, to the left of line A 120, that can be represented by noncancer MCC cluster candidate set, domain $\Omega^-$ 110. Domain $\Omega^-$ 110 is termed the rejected candidate set and grows with each classifier iteration, adding zero or more elements with each subsequent classifier operation. Cancer MCC cluster candidate set, domain $\Omega^+$ 108, the working set or positive candidate set for subsequent cascading classifier processing, is now the area to the right of line A (120).

In a subsequent classifier process, the second classifier B operates on the updated positive candidate set $\Omega^+$ and further discards a portion of the remaining noncancer MCC clusters, assigning them to the rejected candidate set $\Omega^-$. In this way, domain $\Omega^+$ 108 continually decreases (or remains the same) and domain $\Omega^-$ 110 continually increases (or remains the same). A line B 122 now conditionally represents the new border between domain $\Omega^+$ 108 and domain $\Omega^-$ 110.

In the same fashion, in yet another subsequent classifier process, classifier C finalizes the classification of the unknown cancer and noncancer MCC cluster populations into noncancer MCC cluster candidates into the rejected candidate set, to the left of a line 124, and cancer MCC cluster candidates to the right of line 124 into the positive candidate set, with minimum false negatives (represented by an FN region 118) and false positives (represented by area FP 116) as shown in FIG. 1A. (True positives are represented by TP region 112, and true negatives TN are represented by region 114.) The operation of classifier C results in further updated sets $\Omega^+$=[TP, FP] to the right of line C 124 and $\Omega^-$=[TN, FN] to the left of line C 124. From the perspective of the stage-1 classifier system, this is a nested operation that is applied exclusively to each re-defined cancer MCC cluster candidate set $\Omega^+$.

Classifiers A, B, and C of the initial and subsequent classifier processes can be the same classifier, operating under different parameters so that the same process executes more or less aggressively with each iteration, or may be different classifiers, that is, executing different pattern classification algorithms. After a certain number of cascaded classifier iterations, a practical limit is reached, beyond which improvement in more accurately identifying domain $\Omega^+$ 108 proves unrealistic. As is represented in the example of FIG. 1A, some number of false negatives (FN) in an FN region 118 are missed, incorrectly classified and grouped as non-cancer candidates, when classifier C executes. Further, some number of false positives (FP) are incorrectly retained, in an FP region 116, as part of the true positive (TP) set.

Figure 2:
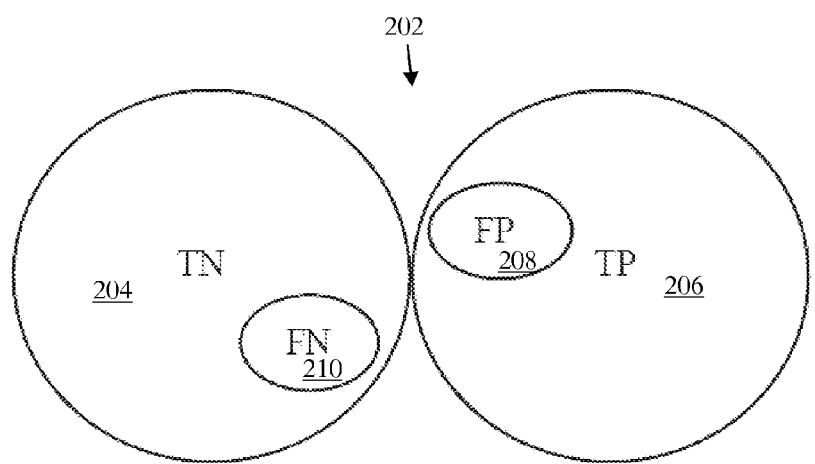
FIG. 2 is an illustration of feature distributions.

The difficulty in achieving higher accuracy relates to some amount of cancer and noncancer population overlap in the feature space in which the classifiers operate. A feature space graph 202 in FIG. 2 illustrates this phenomenon. A TP feature space 206 represents the feature distribution of the majority of cancer MCC clusters. A small proportion of the noncancer MCC clusters, shown as FP feature space 208, share some of the cancer MCC cluster features. A TN region 204 represents the feature distribution of the majority noncancer MCC clusters. A small fraction of the cancer MCC clusters, shown as FN feature space 210, shares some noncancer MCC cluster features. As is clear to those skilled in the art, it is impossible to reclaim these cancer MCC clusters (false negatives FN in FN feature space 210) that share features with the noncancer MCC clusters, without facing the risk of compromising results of the cascade classification system.

Embodiments of the present invention address this problem and the need for enhanced accuracy by applying a two-stage process. In stage-1 processing, two or more cascading classifiers operate on the working or positive candidate set of identified MCC clusters in order to form two mutually exclusive sets: an updated working or positive candidate set $\Omega^+$ and a rejected candidate set $\Omega^-$, as was described with reference to FIG. 1A. Then, stage-2 processing applies one or more reclamation classifiers to the noncancer MCC cluster candidates (TN and FN), shown in the area left of line C 124 in FIG. 1A, which is labeled $\Omega^-$ 110.

Referring to FIG. 1B, the anticipated result of stage-2 processing is indicated by a line D 134 in FIG. 1B that reduces original FN region 118 shown in FIG. 1A to a new FN region 126 shown in FIG. 1B, while introducing an additional FP region 132 as shown in FIG. 1B. The operation of reclamation classifier D updates the set of domain $\Omega^+$ 108 by adding the area of FP region 132 and TP region 130 above a line D 134 and updates the rejected candidate set of domain $\Omega^-$ 110 at the same time, as it assigns one or more members of a reclamation candidate set either back to the rejected candidate set or to the positive candidate set. A benefit of this arrangement is that the stage-2 reclamation classifier process addresses a well-defined problem set and only needs to be trained on a small amount of cancer MCC cluster samples that are left undetected by the stage-1 classifier system.

Using the terminology defined herein, a stage-1 classifier system operates only on working set or positive candidate set $\Omega^+$ and incrementally forms rejected candidate set $\Omega^-$. A stage-2 classifier system then operates on a portion of the rejected candidate set $\Omega^-$ as its "working" set for its reclamation classifier processing. This may include further, more refined pattern classification algorithms, for example. In notational terms, the stage-1 classifier system (denoted by $C^1$) and the stage-2 classifier system (denoted by $C^2$) operate on mutually exclusive sets $\Omega^+$ and $\Omega^-$, where $C^1 \equiv \{C_1^1 \ldots C_{N^1}^1\}$ contains $N^1$ cascaded classifiers, and $C^2 \equiv \{C_1^2 \ldots C_{N^2}^2\}$ contains $N^2$ cascaded classifiers. The sets evolution can be expressed as $$[\Omega_{1,i}^-, \Omega_{1,i}^+] = C_i^1(\Omega_{1,i-1}^+), i \in [1, \ldots N^1] \quad (1)$$

where $\Omega_{1,0}^+$ is the entire cancer and noncancer MCC cluster population, and $$[\Omega_{2,i}^-, \Omega_{2,i}^+] = C_i^2(\Omega_{2,i-1}^-), i \in [1, \ldots N^2], \quad (2)$$

where $\Omega_{2,0}^- = \Omega_{1,N^1}^-$. Intuitively, $\Omega_{1,i}^-$ and $\Omega_{1,i}^+$ are mutually exclusive noncancer MCC cluster candidates (rejected candidates) and cancer MCC cluster candidates (positive candidates) at each evolution step of stage-1 operation; $\Omega_{2,i}^-$ and $\Omega_{2,i}^+$ are mutually exclusive noncancer MCC cluster candidates and cancer MCC cluster candidates at each evolution step of stage-2 operation.

Referring to the flow diagram of FIG. 1C, for a first classifier $C_1^1$ in the stage-1 system, the initial cancer MCC cluster positive candidate set is $\Omega_{1,0}^+$. The initial noncancer MCC cluster rejected candidate set for the first classifier in stage-1 is a null set $\Omega_{1,0}^-$. The first classifier of the stage-1 system generates an updated cancer MCC cluster positive candidate set $\Omega_{1,1}^+$ and an updated noncancer MCC cluster rejected candidate set $\Omega_{1,1}^-$. The sets $\Omega_{1,1}^+$ and $\Omega_{1,1}^-$ become the initial cancer MCC cluster positive candidate set and the initial noncancer MCC cluster rejected candidate set for a second classifier of the stage-1 system. This is a type of nested operation that continues, iteratively, until the stage-1 system produces a final updated cancer MCC cluster positive candidate set $\Omega_{1,N^1}^+$ and a final updated noncancer MCC cluster candidate set $\Omega_{1,N^1}^-$. Obviously, each $\Omega_{1,k}^+, k = [0, \ldots, N^1 - 1]$ is the working set for the classifier processes in the stage-1 system. In the particular example shown in FIG. 1C, set $\Omega_{1,3}^+$, is the final updated cancer MCC cluster positive candidate set.

For a first classifier in the stage-2 system the initial cancer MCC cluster candidate set is $\Omega_{2,0}^+$. The initial noncancer MCC cluster candidate set for the first classifier in the stage-2 system is $\Omega_{2,0}^-$. Some portion of $\Omega_{2,0}^-$ forms a reclamation candidate set for further processing. The first classifier of the stage-2 system generates an updated cancer MCC cluster reclamation candidate set $\Omega_{2,1}^+$ and an updated noncancer MCC cluster rejected candidate set $\Omega_{2,1}^-$. The sets $\Omega_{2,1}^+$ and $\Omega_{2,1}^-$ then become the initial cancer MCC cluster candidate set and the initial noncancer MCC cluster rejected candidate set for a possible second and other additional classifiers of the stage-2 system. This is a type of nested operation that continues until the stage-2 system produces a final updated cancer MCC cluster positive candidate set $\Omega_{2,N^2}^-$ and a final updated noncancer MCC cluster rejected candidate set $\Omega_{2,N^2}^-$. Obviously, each $\Omega_{2,k}^-, k = [0, \ldots, N^2 - 1]$ is the working set for the stage-2 system. In the example of FIG. 1C, only one iteration of stage-2 processing is shown. In practice, any number of iterations can be applied, using either the same classifier algorithm with different parameters or different classifier logic with each iteration.

For each classifier system, considering only the working set, the above two equations (1) and (2) can be rewritten (using nested form) as $$\Omega_{1,N^1}^+ = C_{N^1}^1(C_{N^1-1}^1(\ldots(C_1^1(\Omega_{1,0}^+)))) \quad (3)$$

$$\Omega_{2,N^2}^- = C_{N^2}^2(C_{N^2-1}^2(\ldots(C_1^2(\Omega_{2,0}^-)))) \quad (4)$$

In a sense, the stage-1 or stage-2 classifier system performs a nested operation on their respective sets, which can be expressed in a more general form:

$$\Omega_N = C_N(C_{N-1}(\ldots(C_1(\Omega_0)))) \quad (5)$$

with the expectation that $$\Omega_N \leq \Omega_{N-1} \leq \ldots \Omega_i \ldots \leq \Omega_1 \leq \Omega_0 \quad (6)$$

where $i = [1, \ldots, N]$ and usually each classifier $C_i$ operates on $\Omega_i$ with different features than the features used by other classifiers operating on their respective sets. Note that expression (6) is valid only for the respective working sets ($\{\Omega_{1,i}^+\}$ and $\{\Omega_{2,i}^-\}$) for stage-1 and stage-2 system processing.

Among the four sets ($\Omega_{1,N^1}^-$, $\Omega_{1,N^1}^+$, $\Omega_{2,N^2}^-$ and $\Omega_{2,N^2}^+$), the three sets, $\Omega_{1,N^1}^-$, $\Omega_{1,N^1}^+$ and $\Omega_{2,N^2}^+$, directly affect the overall system performance. The set $\Omega_{1,N^1}^+$ contains most of the true positives and a few false positives. Some portion of the set $\Omega_{1,N^1}^-$ acts as the initial working set for the stage-2 system. The set $\Omega_{2,N^2}^+$ provides additional true positives (TPs) while introducing more false positives (FPs). Moreover, the set $\Omega_{2,N^2}^+$ is considered indecisive because the number of true positives TP may be smaller than the number of the false positives FP in this set.

It should be pointed out that, in practice, not every member in noncancer MCC cluster candidate set $\Omega_{1,N^1}^-$ must be passed along to the stage-2 classifier system as the reclamation candidate set since the majority of the noncancer MCC cluster candidate set $\Omega_{1,N_{1}^{-}}$ are true noncancer MCC clusters with low ranks that are assigned by the stage-1 classifier system. Therefore, based on the ranking information, it is appropriate to select a subset of the noncancer MCC cluster candidate set $\Omega_{1,N_{1}^{-}}$ as the initial reclamation candidate set for the stage-2 classification. That is, $\Omega_{2,0}{}^{-\subset\Omega}{}_{1,N_{1}^{-}}$.

Segmentation

Figure 3A:
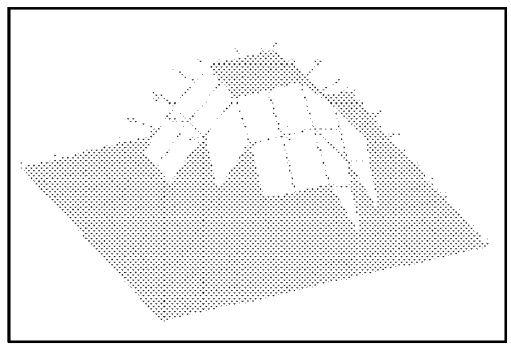
FIG. 3A is a graph illustrating an exemplary MCC spot candidate in a mammogram.

As noted earlier, an improved MCC spot candidate segmentation strategy is used in embodiments of the present invention to provide a foundation for MCC classification. Ideally, an MCC spot possesses a circular cone-like structure. The direction distribution of intensity gradient, which is directional information, of an exemplary MCC spot intensity profile 302 (as shown in FIG. 3A) should follow the pattern 304 shown in FIG. 3B that is the basic vector pattern of a triple-ring filter, such as that used by Hirako in the paper cited earlier. To compute directional features of an MCC spot, Hirako uses a formula $$D = \sum_{k=1}^{n} (1 + \alpha\sin(\theta_k)\cos(\theta_k)/n),$$

where $\theta_k$ is the angle difference between one of the actual gradient vectors (e.g. FIG. 3A) and one of the basic pattern elements of a sub-filter at the direction of element k (e.g. FIG. 3B), n is the number of elements in a sub-filter, and $\alpha$ is a weight.

A significant problem with the conventional directional approach described by Hirako and others relates to the potential for adding noise to the image. In practice, techniques that employ the directional distribution of intensity gradient are disadvantaged for this reason. FIG. 3C shows an illustrative example in which spot candidate segmentation using this conventional approach adds significant noise. Here, the filter response 306 of the convolution operation of the triple-filter basic pattern in FIG. 3B with the direction distribution of intensity gradient of the exemplary MCC spot intensity profile in FIG. 3A is highly anti-symmetric.

Figure 3B:
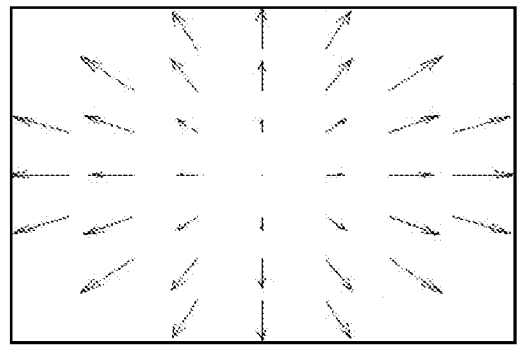
FIG. 3B is a graph illustrating a pattern used in a conventional ring filter.
Figure 3C:
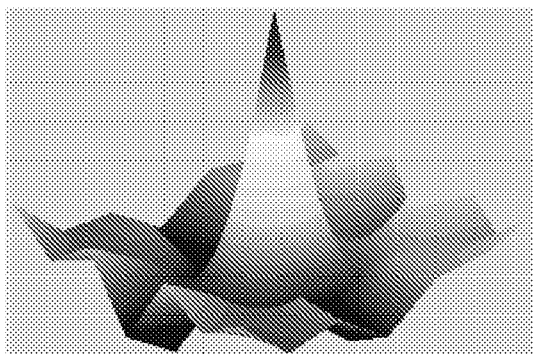
FIG. 3C is a perspective view representation of filter response of a conventional ring filter.
Figure 4:
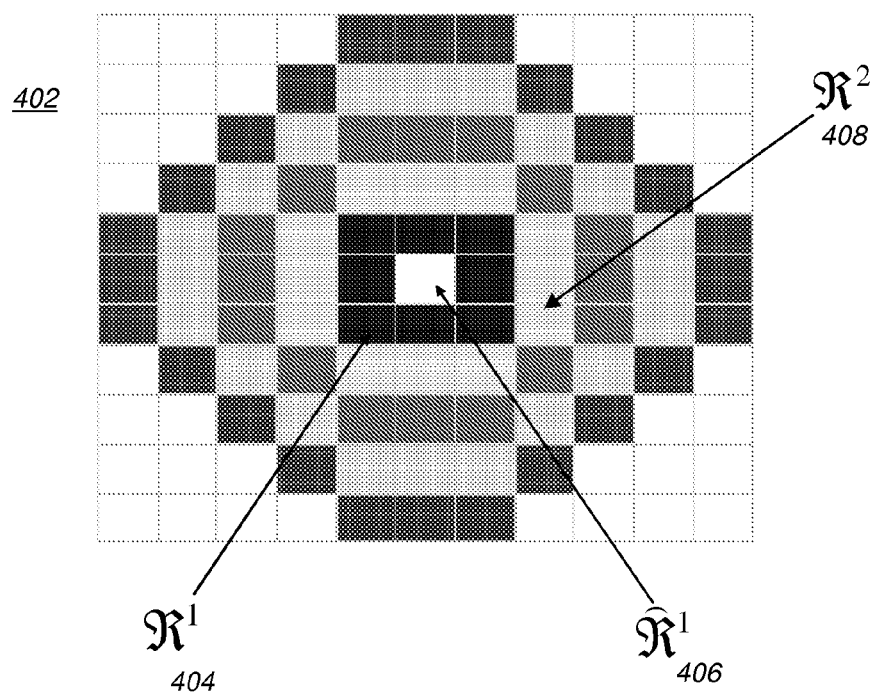
FIG. 4 is a plan view showing a multi-scale ring-like filter of the present invention.

Embodiments of the present invention provide a more robust MCC spot segmentation algorithm using a multi-scale ring-like filter that operates in the gradient magnitude domain rather than in the directional gradient vector space of FIG. 3B used by Hirako. In the gradient magnitude domain, directional information is not used; only the magnitude of the gradient is considered. FIG. 4 is an illustration of a proposed filter 402 that contains five sub-filters, in five shaded rings, with inner elements encircled by respective outer rings. With this arrangement, each sub-filter $S^k$ is independent and separate from the others. Each sub-filter, $S^k$, contains two parts: an outer part (denoted by $\mathfrak{R}^k$) that forms the ring, and an inner part ($\hat{\mathfrak{R}}^k$) that is encircled by the ring. In this example; k∈ [1, . . . N$_f$], N$_f$=5. The presentation of these 5 sub-filters in FIG. 4 is simplified to show the general principles of operation in a straightforward manner.

In this design, as shown in FIG. 4, moving from the center of ring-like filter 402 outwards, it is seen that:

$\aleph(\mathfrak{R}^{k+1}) = \aleph(\mathfrak{R}^k) + 4$ and $\aleph(\aleph) = \mathfrak{R}^k(\aleph) + \hat{\mathfrak{R}}^k(\hat{\mathfrak{R}}^{k+1})$ where $\aleph(\bullet)$ signifies the cardinal number of •. In the present invention, the initial values are $\aleph(\aleph)=8$, $\mathfrak{R}^1(\hat{\mathfrak{R}}^1)=1$, that is, the smallest sub-filter has a single element for its inner part $\hat{\mathfrak{R}}^1(406)$ and 8 elements for its outer part $\mathfrak{R}^1(404)$ (the ring) as shown in FIG. 4. The next sub-filter has 9 elements for its inner part (not labeled, they are overlapped with $\mathfrak{R}^1(404)$ and $\hat{\mathfrak{R}}^1(406)$) and 12 elements for its outer part $\mathfrak{R}^2(408)$.

Denote a gradient magnitude image by $G=\{g_{i,j}\}=|\nabla I|$ where $I=\{I_{i,j}\}$ is the intensity image; i∈[1, . . . , N$_i$], j∈[1, . . . , N$_j$], where N$_i$ is the number of rows and N$_j$ is the number of columns. The convolution operation of a sub-filter $S^k$ and the gradient magnitude image G can be expressed as $$S^k(G) = \bar{S}^k(G)\left(\sum R^k(G)/\aleph(R^k(G))\right) \quad (7)$$

where $$\bar{S}^k(G) = \aleph\left(R^k(G) > \left(\sum \hat{R}^k(G)/\aleph(\hat{R}^k(G))\right)\right) \quad (8)$$

Figure 5A:
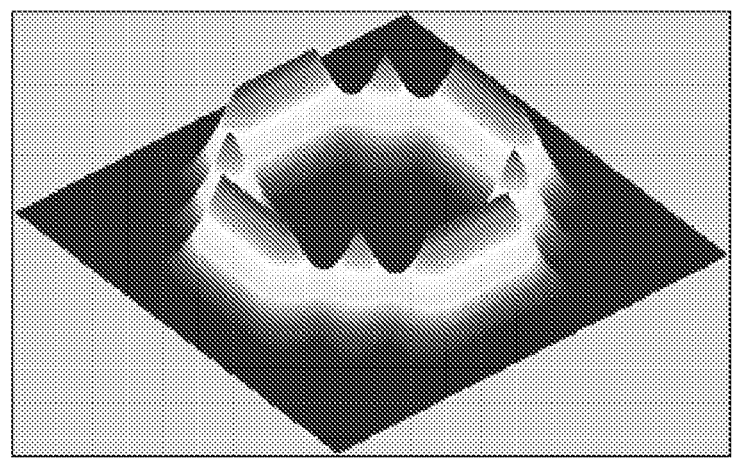
FIG. 5A is an illustration of a gradient magnitude image of a spot as used in embodiments of the present invention.
Figure 5B:
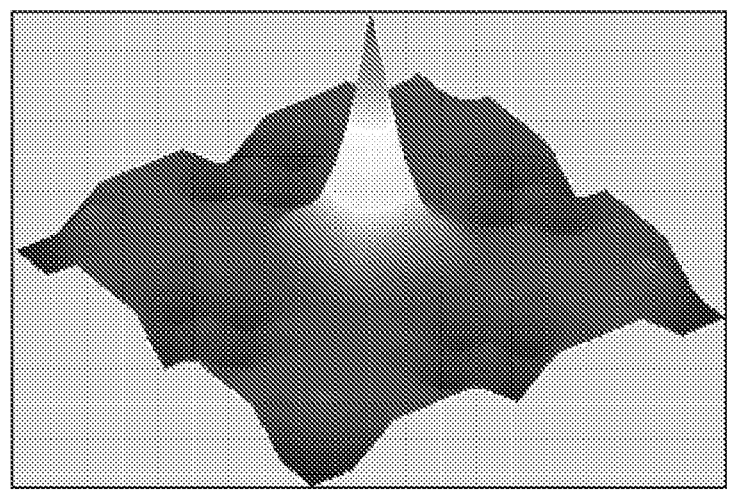
FIG. 5B is an illustration of filter response of the multi-scale ring-like filter of the present invention.

In summary, Equation (7) states that, at each gradient magnitude image pixel location (i, j), the filter output is the product of two terms. The first term is the cardinal number of the set of pixels $\{g_{m,n}\}$ that meet the following conditions: they are covered by the elements of $\mathfrak{R}^k$ and their values are greater than the average value of the pixels $\{g_{m,n}\}$ that are covered by the elements of $\hat{\mathfrak{R}}^k$; the values for m and n are determined by the sub-filter size k and the pixel location (i,j). The second term is the average value of the pixels $\{g_{m,n}\}$ that are covered by the elements of $\mathfrak{R}^k$. To assess the proposed filter response, the same exemplary MCC spot object 302 (FIG. 3A) is used but the proposed filter is operated on the spot gradient magnitude image 502 that is shown in FIG. 5A, rather than on the directional distribution of intensity gradient as was described with respect to FIGS. 3A-3C. The convolution operation of sub-filter $S^3$ (one of the sub-filters of filter 402 in FIG. 4) with gradient magnitude image 502 in FIG. 5A provides a symmetric response 504, with low noise, as shown in FIG. 5B.

Figure 5C:
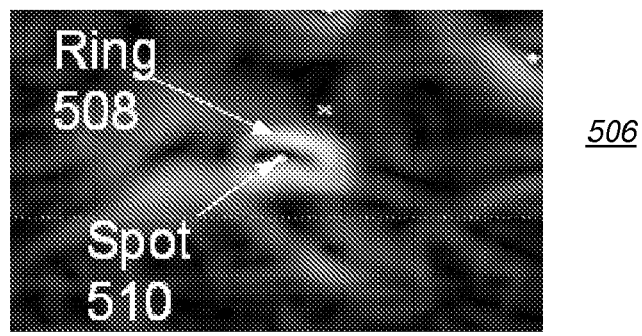
FIG. 5C is a gradient magnitude image of an MCC site in one embodiment.

FIG. 5C displays an actual gradient magnitude image 506 of an MCC spot 510. A ring structure 508 is clearly observable.

It is, however, noted that a dark spot in the intensity image (as opposed to the bright MCC spot) also produces a ring structure in a gradient magnitude image. Therefore, before carrying out the computation of Equation (7) in the gradient magnitude image, a test of type (bright or dark with respect to the background intensity) of the corresponding image area is performed in the image intensity domain, which requires a measure that is produced by the operation of:

$$S^k(I) = \aleph\left(R^k(I) < \left(\sum \hat{R}^k(I)/\aleph(\hat{R}^k(I))\right)\right) \quad (9)$$

This operation (Equation (9)) states that, at each intensity image pixel location (i,j), the filter output is the cardinal number of the set of intensity image pixels $\{I_{m,n}\}$ that meet the following conditions: they are covered by the elements of $\mathfrak{R}^k$ and their values are less than the average value of the pixels $\{I_{m,n}\}$ that are covered by the elements of $\hat{\mathfrak{R}}^k$; the values for m and n are determined by the sub-filter size k and the pixel location (i,j).

Referring back to FIG. 1A, the stage-1 MCC classifier system in the present invention can be constructed by following the conventional procedure that includes image enhancement for spot candidate segmentation, spot classification, spot clustering, and MCC classification with the spot clusters that are MCC cluster candidates. MCC classification uses spot and spot cluster features comprising density features, margin features, morphological features, and texture features. Note that exemplary spot features may include the following:

Density features: characterized by statistics of gray levels, such as mean, minimum, and maximum of pixels on a spot.

Boundary or margin features: characterized by gradient calculated on the spot boundary.

Morphological features: such as shape and size.

Texture analysis: basically using a statistical approach to characterize the stochastic properties of the spatial distribution of gray levels in an image. Specifically, the entropy and homogeneity are calculated.

Other features.

In one embodiment, each of the classifiers in the stage-1 system is trained using some or all of the above mentioned features extracted from spots and spot clusters of both sample cancer MCC spots and clusters and noncancer MCC spots and clusters.

The stage-2 MCC classifier system is then designed to detect MCC cancer clusters that are undetected by the stage-1 classifier system. An examination of the undetected MCC clusters reveals that the misclassification, typically only a small percent of the total cancer MCC cluster population, largely stems from two factors:

(i) there are missing MCC cancer spots in some of the MCC cluster candidates used in the stage-1 classifier system; and (ii) spot and cluster features for these undetected cancer MCC clusters are statistically the same as the features for the noncancer MCC clusters, as described earlier with reference to FIG. 2.

These factors are used to identify a portion of the rejected candidate set from stage-1 processing as the reclamation candidate set.

The spot candidate segmentation method of the present invention re-examines and reclaims the missing spots. It may also use features in the complementary region (background, that is, non-spots and non-spot clusters), as is described in the literature, to bring back cancer MCC clusters that are classified as negatives, but are actually false negatives (FNs) in the stage-1 classifier system.

The algorithm of spot segmentation of an embodiment of the present invention is highlighted in a listing 702 in FIG. 6. An intensity image that contains an MCC cluster candidate is prepared. In listing 702, Step 1 applies gradient magnitude computation to a pixel (i,j) in the intensity image if the pixel's intensity value $I_{i,j}$ exceeds a pre-determined value thd_I (e.g. thd_I=20000 for a 16 bit image). This requirement not only reduces computation expense, but also reduces the likelihood of producing false spots in the consecutive steps.

For each of the sub-filters k (see Step 2 in FIG. 6), the following operations in Steps 3-5 are executed. If conditions are met in Steps 3 and 4 for a pixel in listing 702, the pixel's location (i,j), filter size k, and filter response $S^k(g_{i,j})$ are pushed onto a spot candidate list that will be sorted based on the value of $S^k(g_{i,j})$ and merged with other spots based on their location and size to produce a final spot list. The exemplary predetermined value of thd_g in Step 3 could be computed as $$thd\_g = 0.6(\max_{\forall i,j}\{g_{i,j}\}).$$

The exemplary predetermined value of thd_I2 could be 0.6 k. The exemplary predetermined value for thd_g2 in Step 4 could be 0.6 k. The merge operation in Step 6 first trims the list of spot candidates by removing β percent of the total number of spot candidates that have the lowest $S^k(\bullet)$ values in the list. The exemplary value of β could be 35.0. The merge operation then loops through the list and removes a candidate if it overlaps with another candidate that has a higher $S^k(\bullet)$ value. In one embodiment, this candidate removal process is described by the following code.

```
void Spot::mergeSpotsWithDifferentScales(c_spotInfoVect *spotList)
{
c_spotInfoVectRevitor itor0, itor;//reverse iterator
for(itor0 = spotList->rbegin( ); itor0 < spotList->rend( ) - 1;
itor0++)
{
if((*itor0).toRemove == false)
{
int W = (*itor0).spotSizeIndex;
for(itor = itor0 + 1; itor < spotList->rend( ); itor++)
{
if((*itor).toRemove == false)
{
if(abs((*itor).row - (*itor0).row) < W && abs((*itor).col -
(*itor0).col) < W)
{
(*itor).toRemove = true;
}
}
}
}
}
}
```

In the preceding code, spotList carries the information as shown in Step 5 in listing 702 and spotList is sorted in an ascending order. Element c_spotInfoVect is an STL (standard template library) class. Element c_spotInfoVectRevitor is a type of reverse iterator of c_spotInfoVect. Variable SpotSizeIndex has the value of k in Step 5 in listing 702. Variable row has the value of i and col has the value of j in Step 5 in listing 702. The variable toRemove is initialized as false.

Figure 7A:
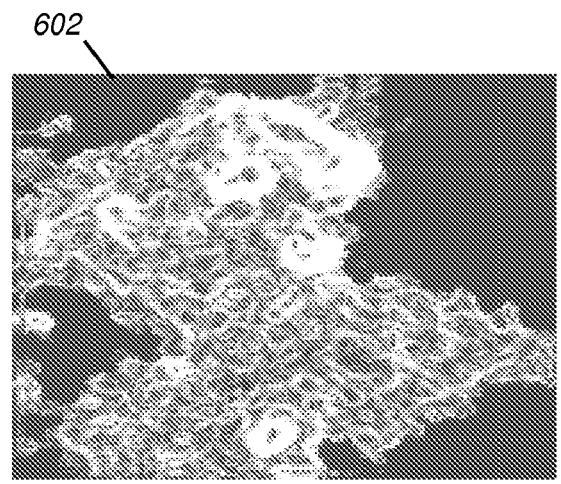
FIG. 7A is a gradient magnitude image showing microcalcifications in a mammography image.
Figure 7B:
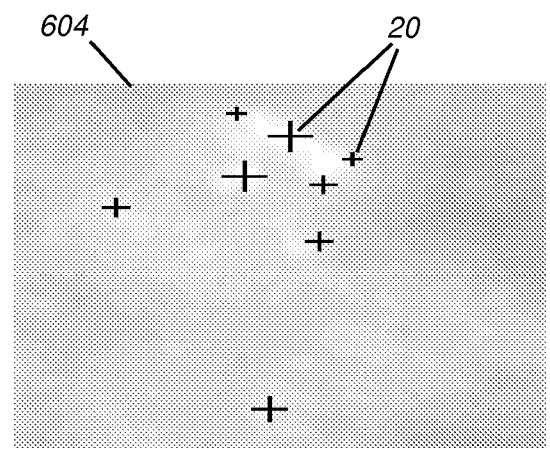
FIG. 7B displays an overlay image for FIG. 7A with spots indicated by cross marks.

FIG. 7A shows an actual gradient magnitude image 602 of a region of interest that contains MCC cancer spots that are confirmed by a radiologist. FIG. 7B shows the resulting image 604 after applying the proposed spot candidate segmentation algorithm to that gradient magnitude image. Eight cross markers 20 indicate the locations of the MCC spot candidates. In this example, the cross mark size approximates the spot size fairly closely. Other conventions could be used for marker 20 appearance. In one embodiment, for example, markers 20 appear in a different color, size, or shape depending on whether suspected MCC sites were detected in initial stage-1 cascade processing, or were reassigned to the positive candidate set from the reclamation set in stage-2 processing.

Unlike the method described by Hirako, as noted earlier in the background section, the multi-scale ring-like filter of the present invention does not use directional information of the MCC spots, thereby avoiding the introduction of noise to the processed image that can result from such a method.

Using the multi-stage processing just described, embodiments of the present invention provide a utility that is capable of incremental improvement in detection of true positives (TPs) over conventional classification methods, including those that utilize cascaded classifiers. In order to achieve these results, however, the user may be forced to tolerate a slightly higher rate of false positives (FPs) at the same time. There can be situations or environments in which this compromise is not acceptable or desirable. For such cases, embodiments of the present invention allow an end-user to temporarily disable the stage-2 classifier to maintain a lower false positive rate if so desired. For example, in one embodiment, a toggle is provided to enable or disable stage-2 processing according to a user interface command.

Because there can be differences in performance expectations from one imaging site to the next, the inventors have recognized that it can be desirable to synergistically integrate human user and computer in the process of microcalcification detection for a practical image processing system, allowing some reconfiguration of system parameters. This not only offers the potential of improved workflow in the diagnostic environment, but also helps to take advantage of diagnostician skills as well as computer capabilities. It is well known, for example, that a trained human observer can excel in creativity, use of heuristics, flexibility, good judgment based on experience, and common sense; while a computer excels in speed, power, and accuracy of computation, storage and accessibility, and perseverance in tackling repetitive problems.

Figure 8:
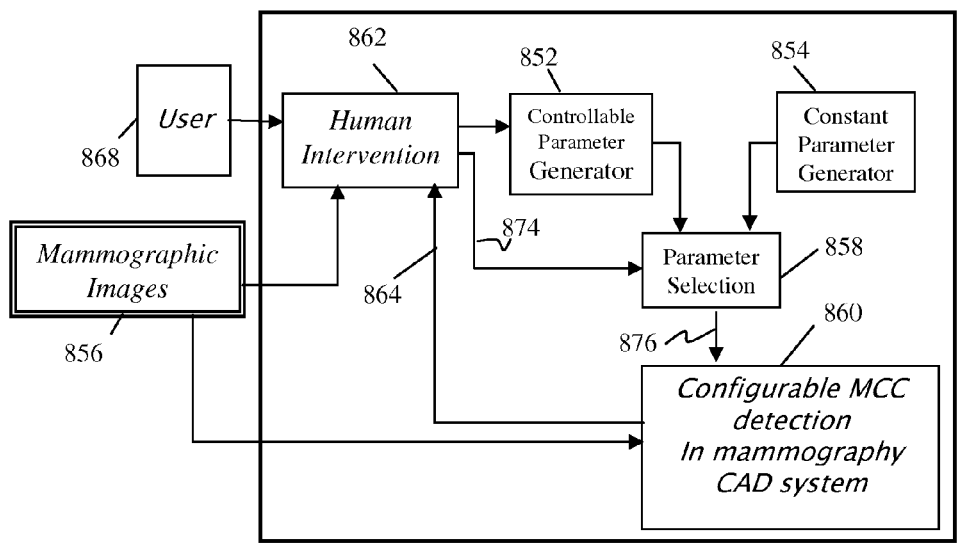
FIG. 8 is a graph illustrating an exemplary workflow of an embodiment of the present invention.

One effective method for improved synergy of human and computer resources can be realized by incorporating a detection parameter control into the CAD workflow. In a workflow 850 for a configurable MCC detection system 850 in FIG. 8, there is provided a parameter selection step 858 that allows participation of the human user 868 in the process loop. Parameter selection step 858 selects a set of parameters either from a constant parameter generator 854 or from a controllable parameter generator 852. Parameter selection step 858 sends the selected parameters to a detection step 860 through a path 876. Controllable parameter generator 852 is manipulated by human user 868 through a human intervention step 862. Human user 868 receives input information 856 or feedback 864 from the detection output and makes a decision to use parameters either from constant parameter generator 854 or from controllable parameter generator 852. Using this configuration facility, for example, allows a human operator to selectively set up how rigorously or aggressively the classification processes execute, and even to selectively disable execution of the stage-2 classifiers where this is desired.

The method provided by the present invention for building a practical MCC detection system provides an integrated solution to the MCC detection problem by constructing a configurable detection system. This configurable system can be configured or reconfigured by commands from the human user 868 through a command line 874.

In general, the configurable detection system can be configured differently in a workflow or, equivalently, forming different workflows. Exemplary workflows of configurable MCC detection system 860 are described in the preceding sections.

The present invention has been described as a method, executed at least in part by a computer system. In one embodiment, the present invention comprises a computer program product for microcalcification detection in mammography CAD in accordance with the method described. In describing the present invention, it should be apparent that a computer program of an embodiment of the present invention may be utilized by a suitable, general-purpose computer system, such as a personal computer or workstation. However, many other types of computer systems can be used to execute the computer program of the present invention. The computer program for performing the method of the present invention may be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to presently preferred embodiments, but it will be understood that variations and modifications can be effected that are within the scope of the invention. For example, various types of classifiers can be used for initial, subsequent, or reclamation classifiers, such as trained classifier algorithms. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 20 | marker |
| 70 | stage-1 operation |
| 80 | stage-2 operation |
| 102 | population box |
| 103 | divider |
| 104 | cancer clusters |
| 106 | noncancer clusters |
| 108 | domain $\Omega^+$ |
| 110 | domain $\Omega^-$ |
| 112 | TP region |
| 114 | TN region |
| 116 | FP region |
| 118 | FN region |
| 120 | line A |
| 122 | line B |
| 124 | line C |
| 126 | FN region |
| 130 | TP region |
| 132 | FP region |
| 134 | line D |
| 202 | feature space (graph) |
| 204 | TN feature space |
| 206 | TP feature space |
| 208 | FP feature space |
| 210 | FN feature space |
| 302 | spot |
| 304 | pattern |
| 306 | response |
| 402 | filter |

-continued

PARTS LIST

| | |
|---|---|
| 404 | outer part |
| 406 | inner part |
| 408 | outer part |
| 502 | gradient magnitude image |
| 504 | response |
| 506 | gradient magnitude image |
| 508 | ring structure |
| 510 | MCC spot |
| 602 | gradient magnitude image |
| 604 | image |
| 702 | listing |
| 850 | system |
| 852 | controllable parameter generator |
| 854 | constant parameter generator |
| 856 | input information |
| 858 | step |
| 860 | step |
| 862 | step |
| 864 | feedback |
| 868 | human user |
| 874 | command line |
| 876 | path |
| A, B, C | classifier |
| $\Omega^+$ | Positive candidate set |
| $\Omega^-$ | Rejected candidate set |

The invention claimed is:

1. A method of microcalcification detection in a digital mammographic image, comprising:
   identifying one or more potential microcalcification sites in the mammographic image according to spot clustering criteria;
   assigning each of the one or more potential microcalcification sites either as a member of a positive candidate set or as a member of a rejected candidate set according to results from an initial classifier process;
   optionally executing at least one subsequent classifier process that selectively assigns zero or more members of the positive candidate set to the rejected candidate set according to results from the at least one subsequent classifier process;
   selecting one or more members of the rejected candidate set as a reclamation candidate set according to results from the initial and any subsequent classifier process; and
   assigning one or more members of the reclamation candidate set either back to the rejected candidate set or to the positive candidate set according to results from a reclamation classifier process.

2. The method of claim 1 wherein the initial classifier process employs one or more pattern classification algorithms as classifiers.

3. The method of claim 1 wherein identifying one or more potential microcalcification sites in the mammographic image according to spot clustering criteria comprises:
   applying one or more image enhancement algorithms to the mammographic image;
   applying an image segmentation algorithm to the enhanced mammographic image, based on the pixel intensity values; and
   grouping segmented image pixels into spots.

4. The method of claim 1 wherein identifying one or more potential microcalcification sites in the mammographic image according to spot clustering criteria comprises:
   forming spots from connected pixels having brightness of at least a predetermined threshold; and
   identifying each cluster having at least a predetermined number of spots wherein any one spot is within a predefined distance from at least one of the other spots within the cluster.

5. The method of claim 1 wherein the reclamation classifier process employs one or more pattern classification algorithms as classifiers.

6. The method of claim 1 further comprising displaying microcalcification sites corresponding to the positive candidate set on a display screen with markers of a first color.

7. The method of claim 6 further comprising displaying microcalcification sites that were added to the positive candidate set by the reclamation classifier process with markers of a second color.

8. The method of claim 1 further comprising displaying microcalcification sites corresponding to the positive candidate set on a display screen with markers of a first shape.

9. The method of claim 8 further comprising displaying microcalcification sites that were added to the positive candidate set by the reclamation classifier process with markers of a second shape.

10. The method of claim 1 wherein at least one of the initial classifier, subsequent classifier, or reclamation classifier processes uses a trained classifier algorithm.

11. The method of claim 1 wherein assigning one or more members of the reclamation candidate set comprises:
   selecting a subset of pixels associated with the reclamation candidate set according to pixel intensity;
   computing gradient magnitude data for the selected subset of pixels;
   applying one or more ring filters to the gradient magnitude data for each pixel in the selected subset and storing ring filter size and pixel location and filter response data in a spot candidate list; and
   sorting the spot candidate list according to filter response data.

12. A method of microcalcification detection in a digital mammographic image, comprising:
   a) identifying one or more potential microcalcification sites in the mammographic image according to spot clustering criteria;
   b) obtaining parameters for one or more classifiers from a human operator;
   c) executing the one or more classifiers, with the obtained parameters, to assign each of the one or more potential microcalcification sites to either a positive candidate set or a rejected candidate set, wherein the positive candidate set and rejected candidate sets are mutually exclusive; and
   d) responding to an operator instruction to execute at least one additional classifier on a portion of the rejected candidate set and re-assigning at least one member of the portion of the rejected candidate set to the positive candidate set.

13. The method of claim 12 further comprising displaying calcification sites assigned to the positive candidate set in step c) with markers of a first color, size, or shape and displaying re-assigned calcification sites from step d) with markers of a second color, size, or shape.

14. The method of claim 12 wherein the portion of the rejected candidate set in step d) is selected according to ranking from a previous classifier execution in step c).

* * * * *